(12) United States Patent
Ho et al.

(10) Patent No.: US 7,222,350 B2
(45) Date of Patent: May 22, 2007

(54) GEAR TRANSMISSION SYSTEM FOR AN OPTICAL DISK DRIVE

(75) Inventors: Chun-Lung Ho, Hsinchu (TW); Yi-Cheng Tsao, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 374 days.

(21) Appl. No.: 11/002,239

(22) Filed: Dec. 3, 2004

(65) Prior Publication Data

US 2005/0132388 A1    Jun. 16, 2005

(30) Foreign Application Priority Data

Dec. 12, 2003    (TW) .............................. 92135173 A (51) Int. Cl.
*G11B 33/02* (2006.01)
(52) U.S. Cl. ..................................... 720/607
(58) Field of Classification Search ............ None
See application file for complete search history.

(56) References Cited

U.S. PATENT DOCUMENTS

2005/0114872 A1*    5/2005    Liu ............................ 720/607

\* cited by examiner

*Primary Examiner*—David Davis
(74) *Attorney, Agent, or Firm*—Birch, Stewart, Kolasch & Birch, LLP (57) ABSTRACT

A disk drive includes a gear transmission system disposed with a casing. The gear transmission system includes first and second gears, a driving plate having a right serrated portion meshed with the first gear, and a left serrated portion disposed adjacent to and facing the third gear. Rotation of the second gear in clockwise and anti-clockwise directions alternately results in movement of the driving plate in left and right sides of the casing, which, in turn, results in engagement and disengagement of the third gear with the left serrated portion of the driving plate, alternately. The driving plate further has an open-ended slot formed at the left end of the driving plate and adjacent to the left serrated portion in such a manner to provide resilience when the left serrated portion is engaged with the third gear.

10 Claims, 11 Drawing Sheets

GEAR TRANSMISSION SYSTEM FOR AN OPTICAL DISK DRIVE

FIELD OF THE INVENTION

The present invention relates to an optical disk drive, more particularly to a gear transmission system for the optical disk drive to overcome jamming between gears in the gear transmission system of the optical disk drive such that the disk tray will not be disposed midway due to jamming between the gears during the extending and retracting operations of the disk tray with respect to a casing.

BACKGROUND OF THE INVENTION

Among all the data storage solutions, the optical disks are becoming more and more important for backing up data and exchanging information because the optical disks have many advantages including a high storage capacity, easy to handle and carry, and a long preserving time for the stored data. Till now, the optical disk drives can be found all around such as in desktop computers, laptop computers, DVD players, and even some instruments or electronic products with built-in microprocessors.

Figure 1:
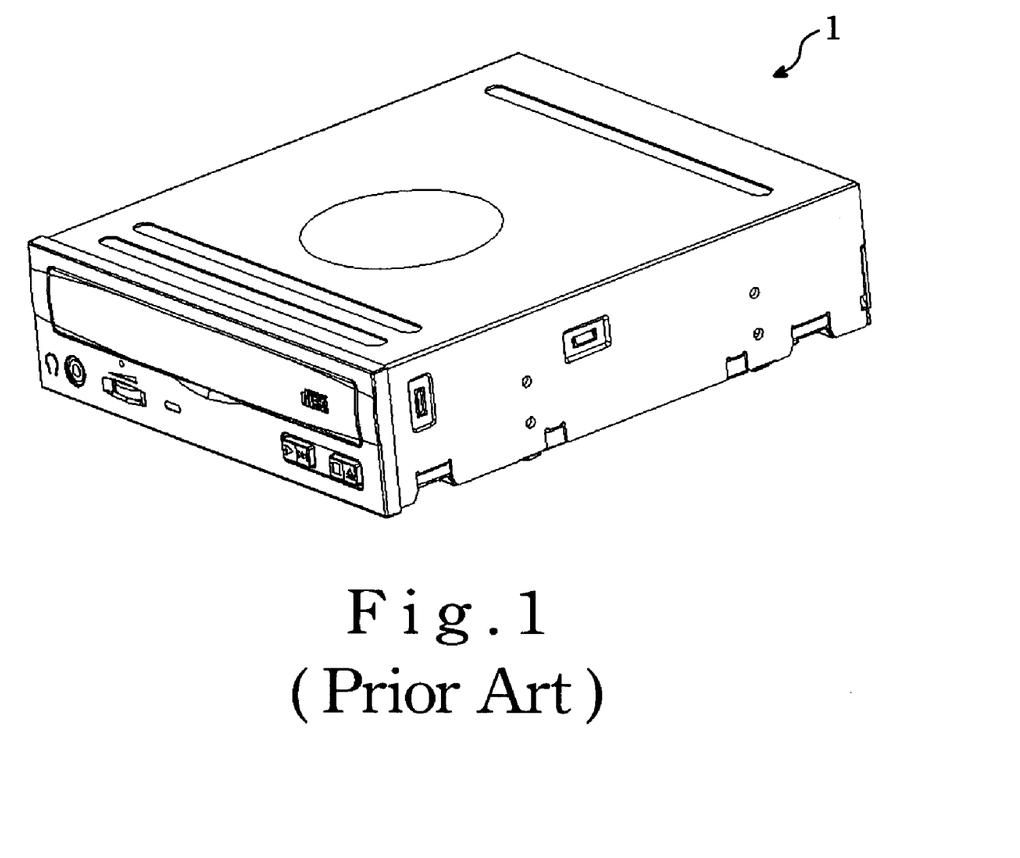
FIG. 1 is a perspective view of a conventional optical disk drive.
Figure 2:
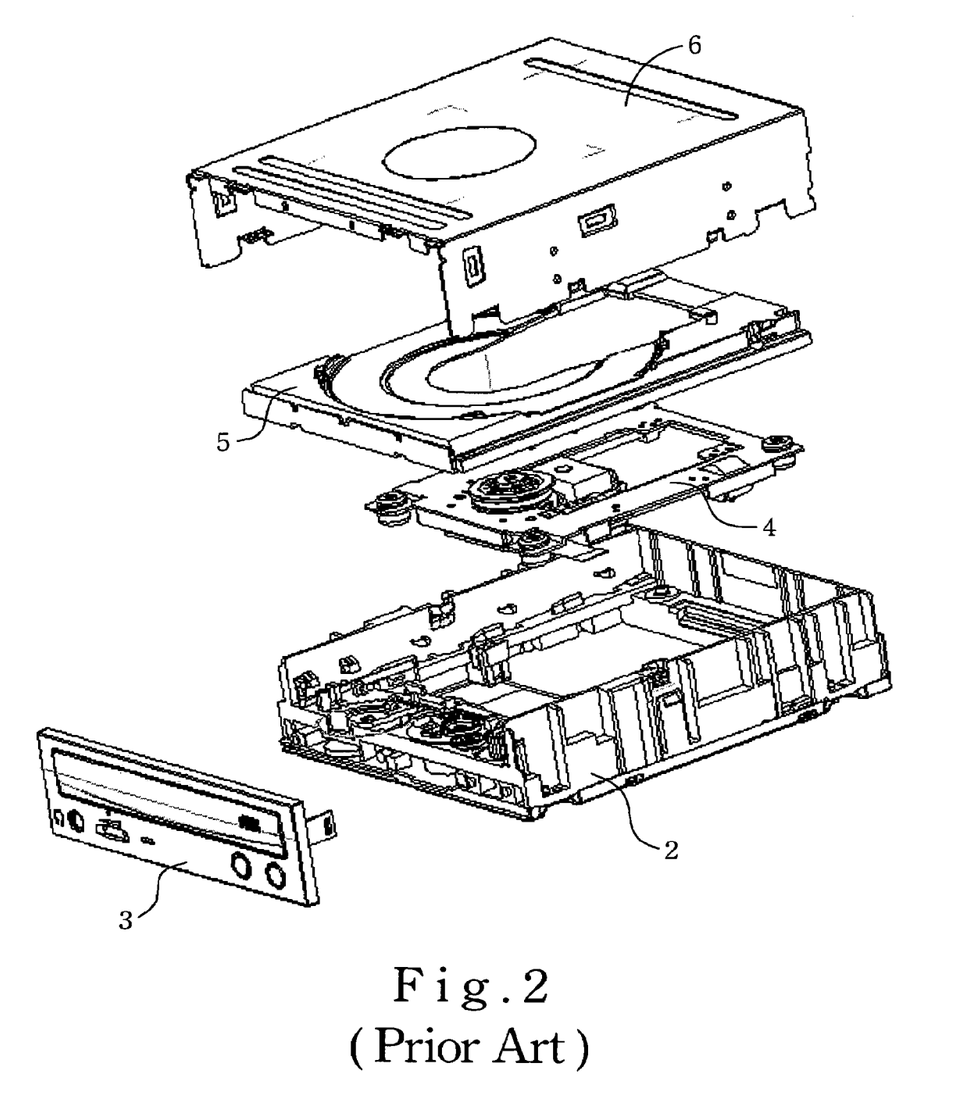
FIG. 2 is an exploded view of the conventional optical disk drive.

Referring to FIGS. 1 and 2, perspective and exploded views of a conventional optical disk drive are shown to include a lower casing half 2, an upper casing half 6 coupled to the lower casing half 2 to form a casing 1, a chassis 4 disposed within the casing 1 for carrying a pick-up head thereon, a front panel 3 fixed to and covering the front open end of the casing 1, and a disk tray 5 disposed within the casing 1 above the chassis 4.

Figure 3:
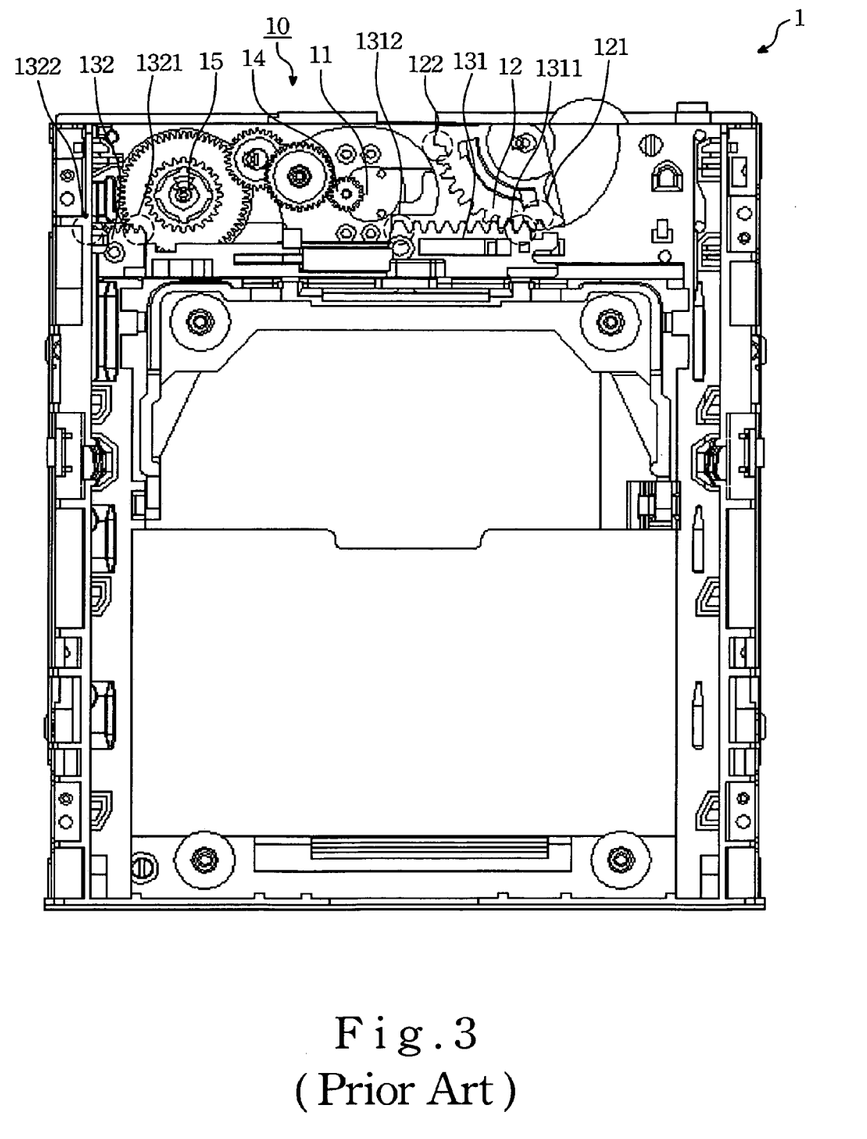
FIG. 3 is a top planar view of a lower casing half in the conventional optical disk drive, illustrating the driving plate is at the left side of the lower casing half.
Figure 4:
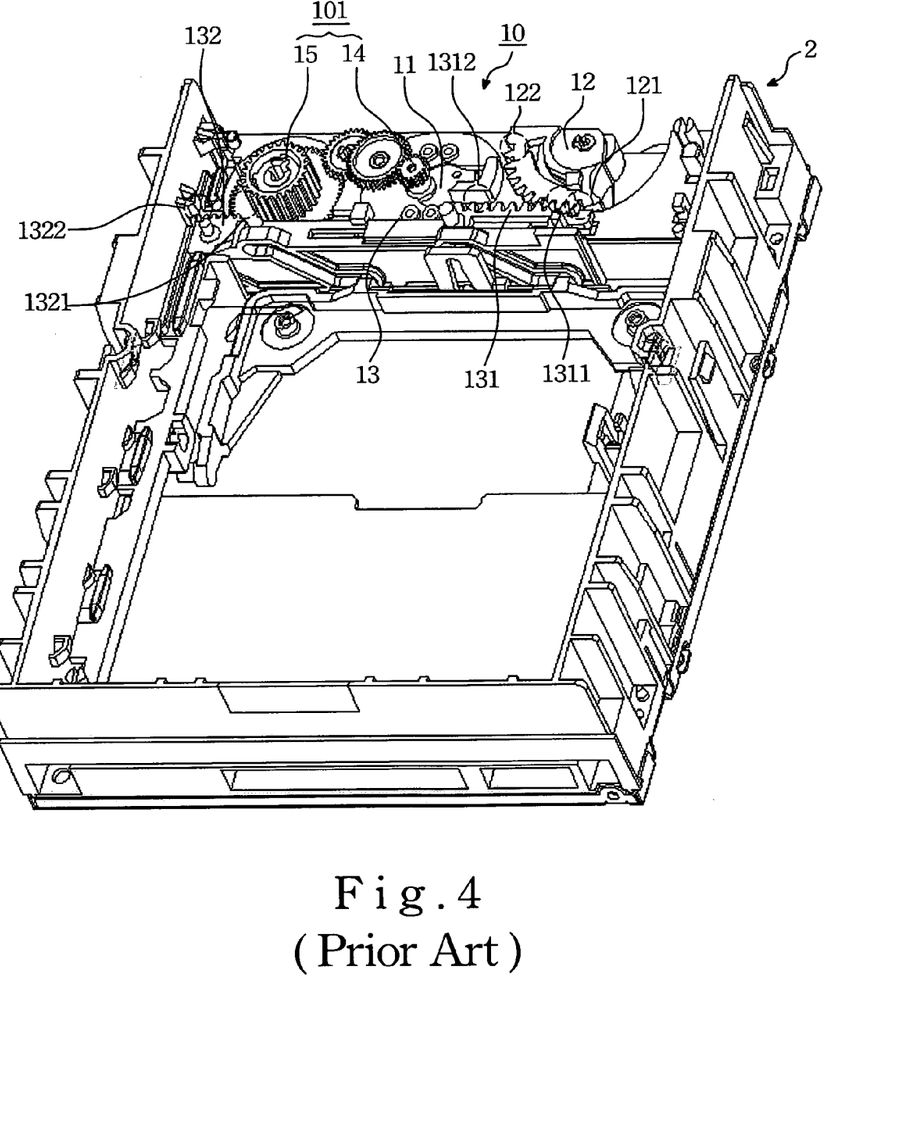
FIGS. 4 and 5 respectively show perspective views of the lower casing half in the conventional optical disk drive, illustrating the driving plate is at the left and right sides of the lower casing half respectively.
Figure 5:
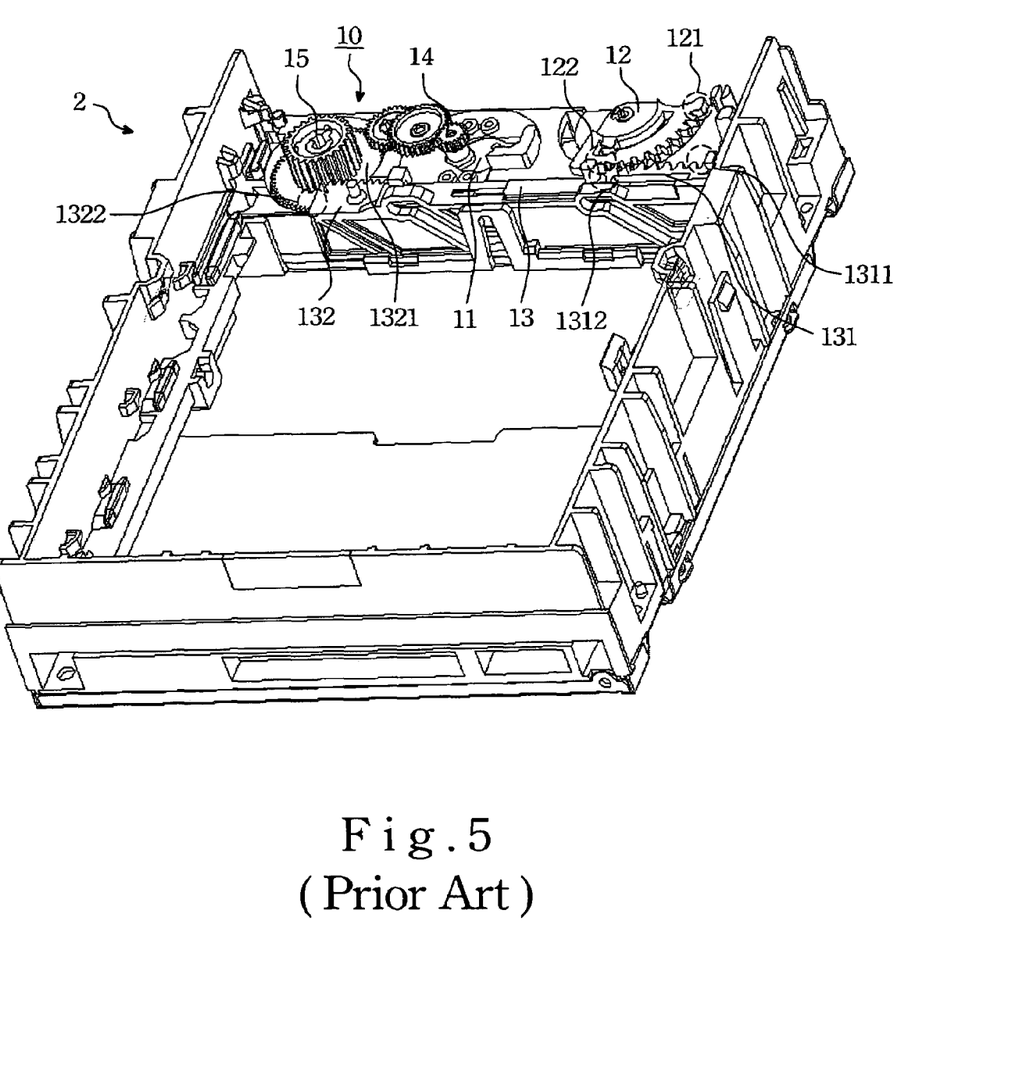

Referring to FIGS. 3 and 4, top and perspective views of the lower casing half 2 are shown to include a gear transmission system 10 for driving the disk tray 5 (see FIG. 2) between an extended position, in which, the disk tray 5 extends outwardly from the casing 1 via an entrance-and-exit slot formed through the front panel 3, and a retracted position, in which, the disk tray 5 retracts inwardly into the casing 1 via the entrance-and-exit slot. The gear transmission system 10 includes a first gear 12, a gear transmission unit 101, and a driving plate 13. The first gear 12 is disposed within the lower casing half 2. The gear transmission unit 101 includes a driving motor 11, a second gear 14 fixed co-axially on an output shaft of the driving motor 11, and a third gear 15 coupled to the second gear 14 via a plurality of transmission gears in such a manner that rotation of the second and third gears 14, 15 results in movement of the disk tray 5 between the extended and retracted positions. The driving plate 13 is disposed within the lower casing half 2 and extends in a transverse direction relative to a longitudinal axis of the lower casing half 2. The driving plate 13 is movable along the transverse direction to left and right sides of the lower casing half 2 (see FIGS. 4 and 5). The driving plate 13 has a right serrated portion 131 meshed with the first gear 12, and a left serrated portion 132 disposed adjacent to and facing the third gear 15. The third gear 15 is further operably associated with the disk tray 5 in such a manner that rotation of the third gear 15 in clockwise and anti-clockwise directions alternately results in movement of the disk tray 5 to the retracted and the extended positions and movement of the driving plate 13 to the left and right sides of the lower casing half 2.

Figure 6:
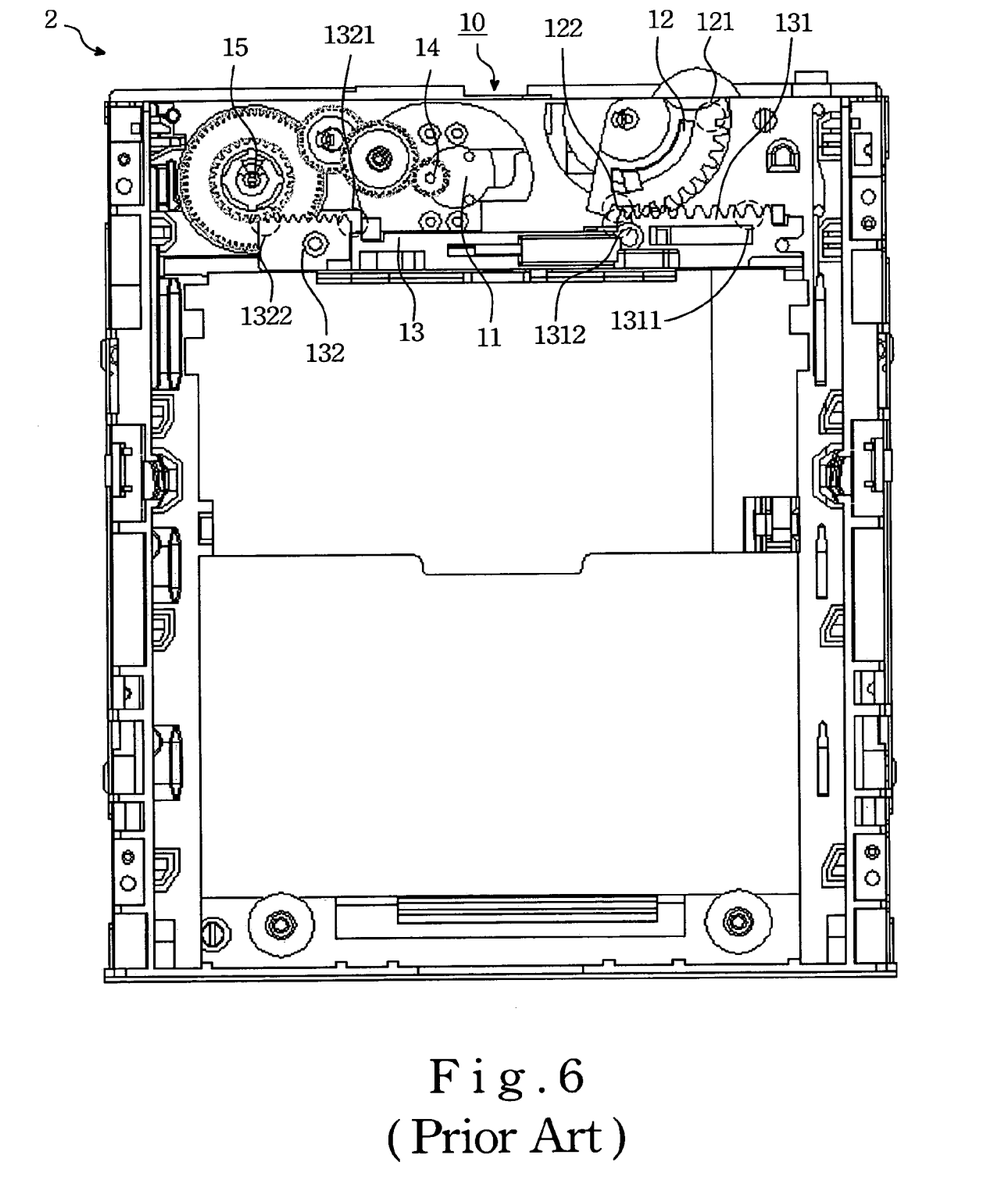
FIG. 6 is a top planar view of the lower casing half in the conventional optical disk drive, illustrating a driving plate is at the right side of the lower casing half.
Figure 7A:
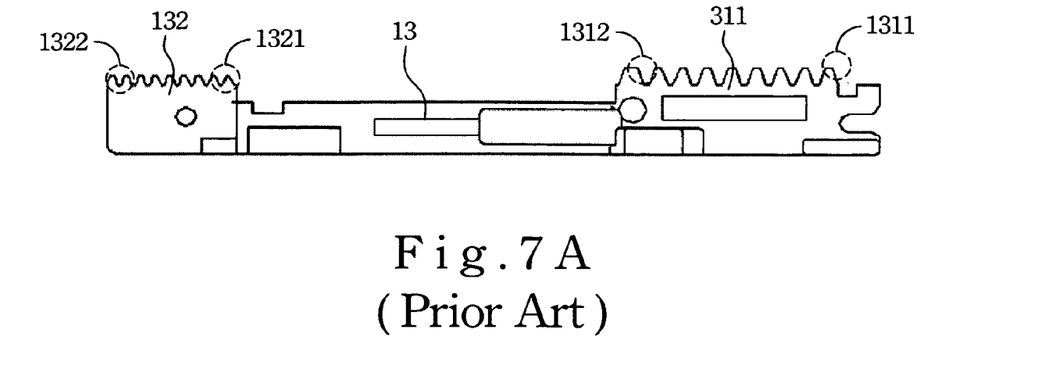
FIGS. 7A, 7B and 7C respectively show top, rear and front views of a driving plate employed in the conventional optical disk drive.
Figure 7B:
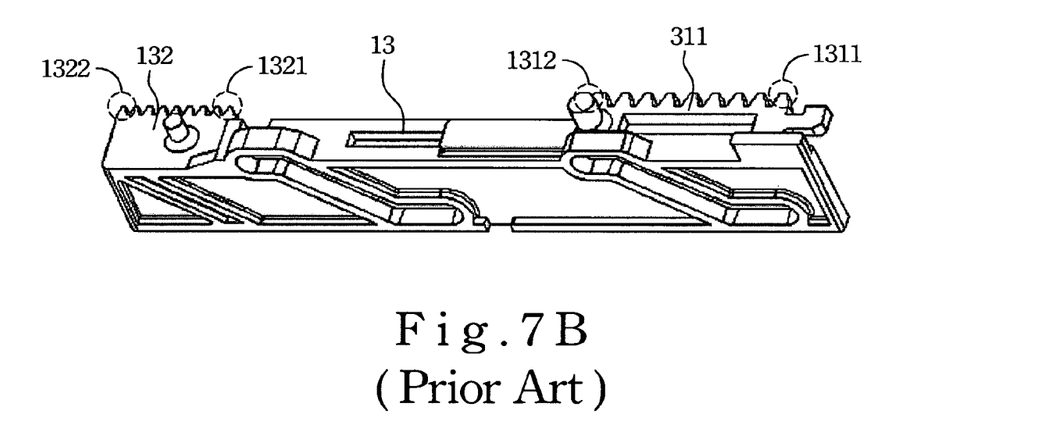
Figure 7C:
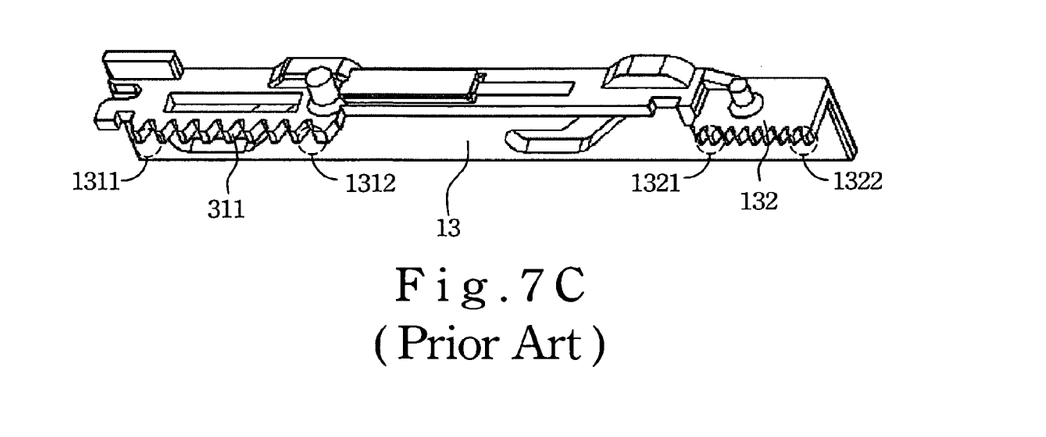

When the disk tray 5 is in the extended position (not shown), the driving plate 13 is moved to the left side of the lower casing half 2, the first end 1311 of the right serrated portion 131 is meshed with the first end 121 of the first gear 12, and the first end 1321 of the left serrated portion 132 is not engaged with the third gear 15 (see FIGS. 3, 4 and 7A). In the same manner, when the disk tray 5 is in the retracted position (not shown), the driving plate 13 is moved to the right side of the lower casing half 2, the second end 1312 of the right serrated portion 131 is meshed with the second end 122 of the first gear 12, and the second end 1322 of the left serrated portion 132 is engaged with the third gear 15 (see FIGS. 5, 6 and 7A).

In the aforesaid conventional disk drive, the left serrated portion 132 is not constantly meshed with the third gear 15. The left serrated portion 132 is started to engage with the third gear 15 in the midway of the inletting process of the disk tray 5 so that the engagement between the first end 1321 and the third gear 15 could be improper. Thus, jamming of the left serrated portion 132 with respect to the third gear 15 may occur. Moreover, after completing inletting process of the disk tray 5, the second end 1322 of the left serrated portion 132 is engaged with the third gear 15, the third gear 15 would apply a force on the second end 1322 which may cause the broken of the tooth of the second end 1322.

SUMMARY OF THE INVENTION

The object of the present invention is to provide a gear transmission system for an optical disk drive. The gear transmission system of the optical disk drive is capable of overcoming the disadvantage generally encountered during use of the conventional disk drive.

In one aspect of the present invention, a disk drive includes: a casing defining a longitudinal axis; a disk tray disposed therein and movable between an extended position, in which, the disk tray extends outwardly from the casing and a retracted position, in which, the disk tray retracts inwardly into the casing; and a gear transmission system. The gear transmission system includes: a first gear disposed within the casing; a gear transmission unit including a second gear and a third gear, rotation of the second and third gears resulting in movement of the disk tray between the extended and retracted positions; and a driving plate disposed within the casing to extend in a transverse direction relative to the longitudinal axis of the casing, and movable along the transverse direction to left and right sides of the casing, the driving plate having a right serrated portion meshed with the first gear, and a left serrated portion disposed adjacent to and facing the third gear, the driving plate being operably associated with the disk tray in such a manner that the left serrated portion of the driving plate is started to engage with the third gear during the disk tray inletting to the retracted position so as to be driven by the third gear, wherein the driving plate further has an open-ended slot formed at the left end of the driving plate and adjacent to the left serrated portion in such a manner to provide resilience when then left serrated portion is engaged with the third gear.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTIONS OF THE PREFERRED EMBODIMENT

Figure 8:
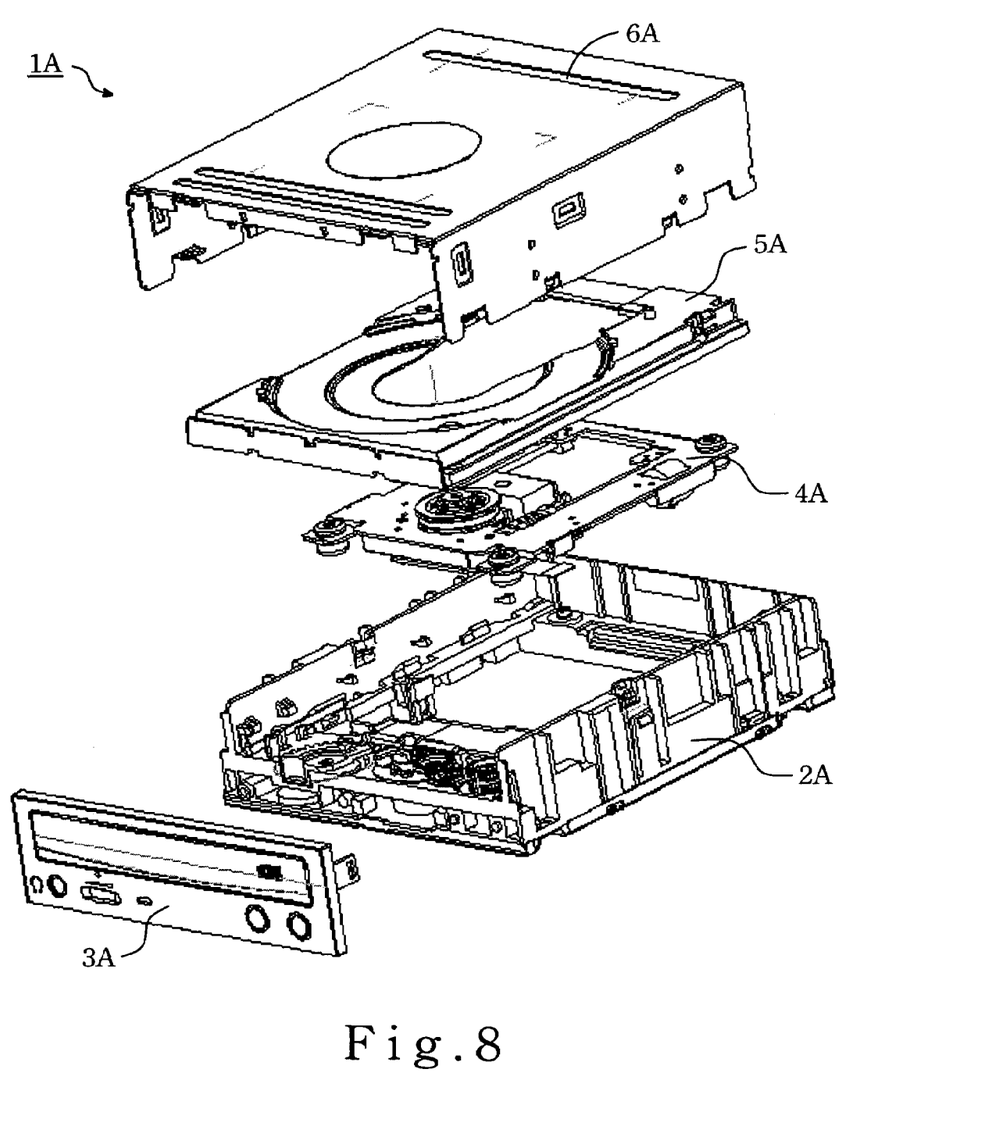
FIG. 8 is an exploded view of an optical disk drive according to the present invention.
Figure 9:
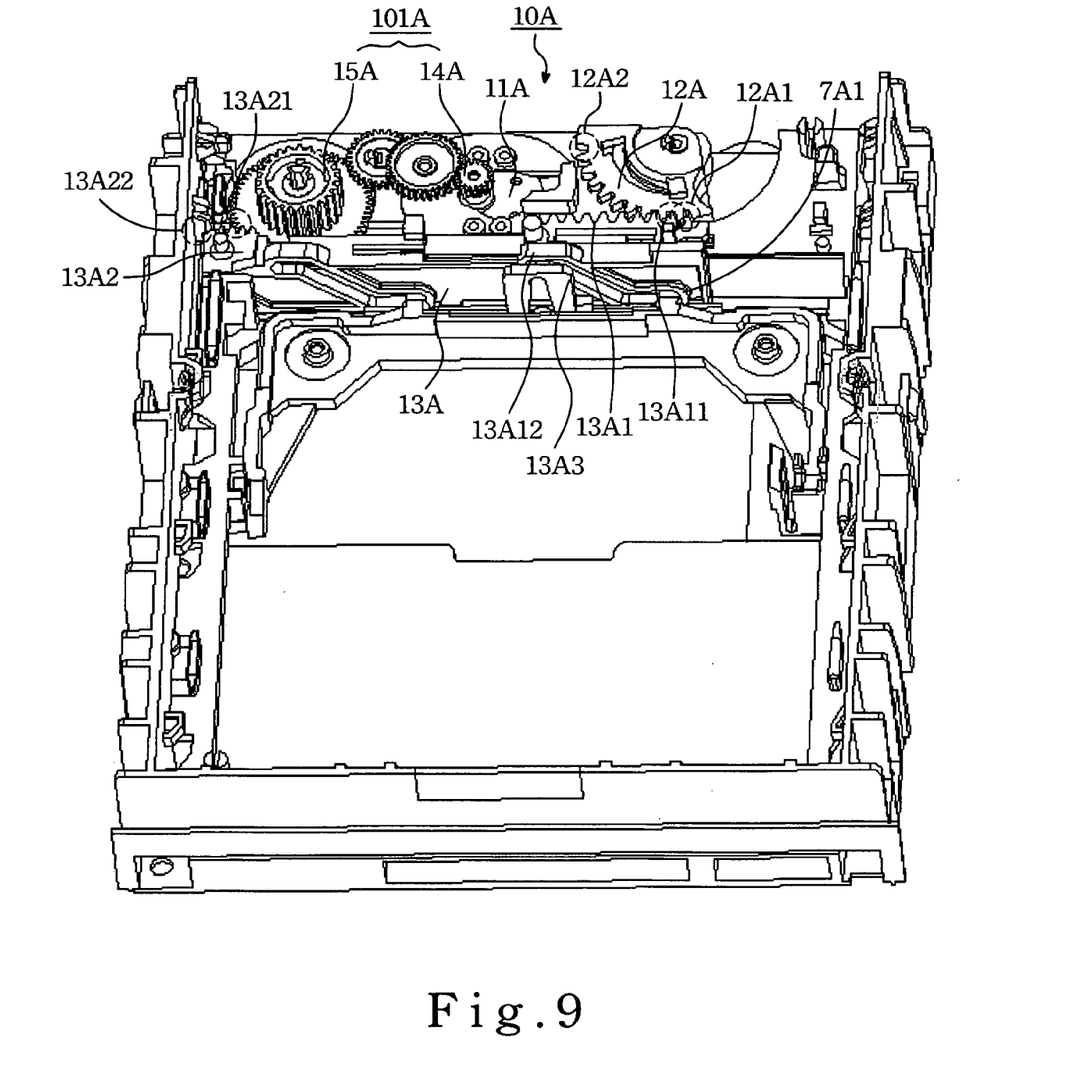
FIG. 9 is a perspective rear view of a lower casing half in the optical disk drive of the present invention, illustrating the driving plate is at the left side of the lower casing half.
Figure 10A:
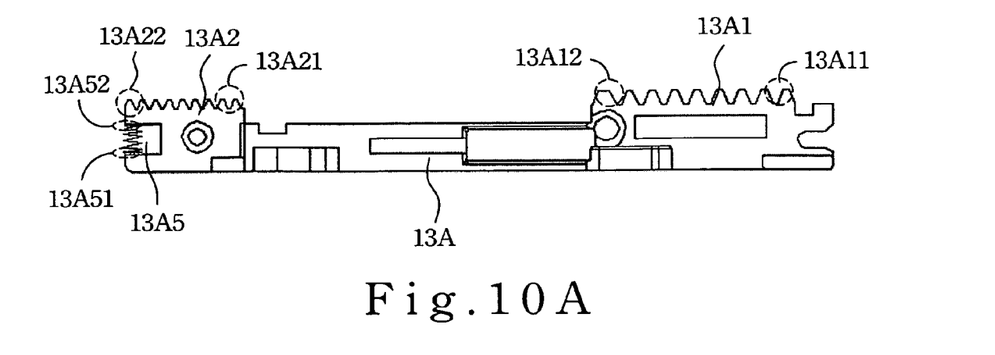
FIGS. 10A, 10B and 10C respectively show top, rear and front views of a driving plate employed in the optical disk drive of the present invention.
Figure 10B:
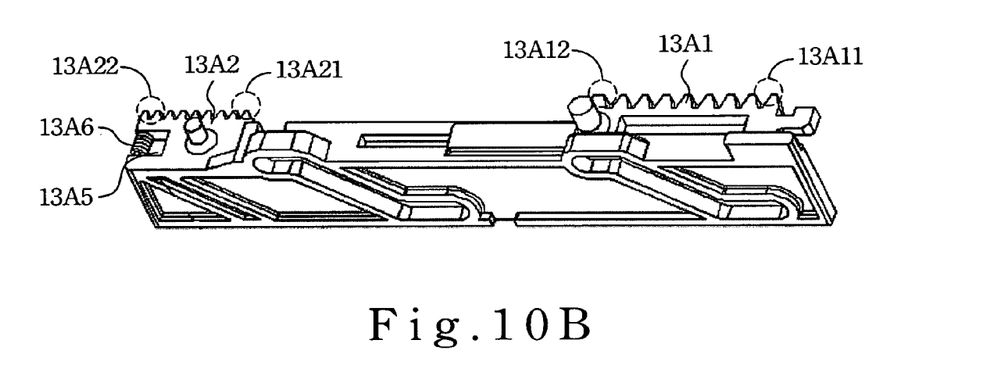
Figure 10C:
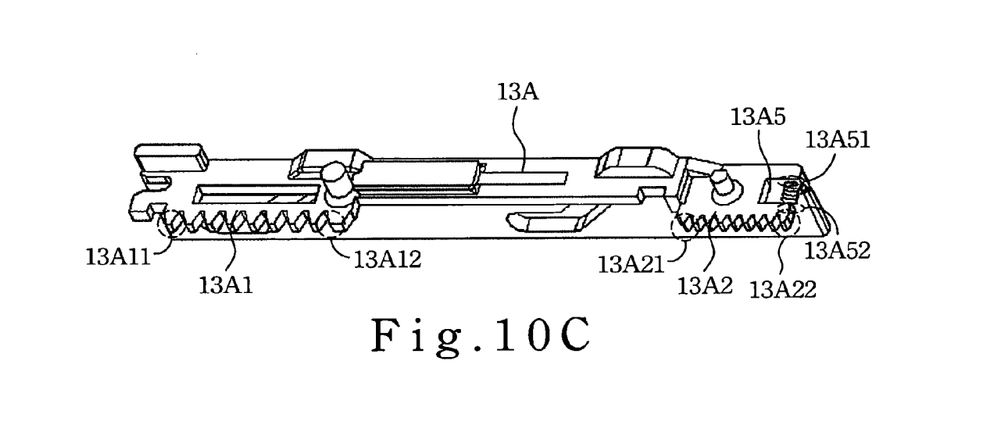

Referring to FIGS. 8 to 10, an optical disk drive of the present invention is shown to include a casing 1A formed by coupling upper and lower casing halves 6A, 2A, a chassis 4A disposed within the casing 1A for carrying a pick-up head thereon, a front panel 3A fixed to and covering the front open end of the casing 1A, and a disk tray 5A disposed within the casing 1A above the chassis 4A.

As illustrated, a gear transmission system 10A is mounted in the lower casing half 2A for driving the disk tray 5A to move between an extended position (not shown), in which, the disk tray 5A extends outwardly from the casing 1A via an entrance-and-exit slot formed through the front panel 3A, and a retracted position, in which, the disk tray 5A retracts inwardly into the casing 1A via the entrance-and-exit slot in the front panel 3A. The gear transmission system 10A includes a first gear 12A, a gear transmission unit 101A and a driving plate 13A. The first gear 12A is disposed within the lower casing half 2A. The gear transmission unit 101A includes a driving motor 11A, a second gear 14A fixed co-axially on an output shaft of the driving motor 11A, and a third gear 15A coupled to the second gear 14A via a plurality of transmission gears in such a manner that rotation of the second and third gears 14A, 15A results in movement of the disk tray 5A between the extended and retracted positions (not shown). The third gear 15A is meshed with a rack of the disk tray 5A, a detailed structure thereof is disclosed in U.S. Pat. No. 6,590,849.

The driving plate 13A is disposed within the lower casing half 2A, extends in a transverse direction relative to a longitudinal axis of the lower casing half 2A. The driving plate 13A has a right serrated portion 13A1 meshed with the first gear 12A, and a left serrated portion 13A2 disposed adjacent to and facing the third gear 15A. The driving plate 13A further has an open-ended slot 13A5 (see FIG. 10B) formed adjacent to the left serrated portion 13A2 in such a manner to provide resilience thereto. The open-ended slot 13A5 is defined by a slot-confining wall having opposite front and rear wall sections and a lateral side wall section interconnecting the front and rear wall sections. The driving plate 13A further includes a pair of protrusive stubs 13A51, 13A52 (see FIG. 10A) respectively fixed to the front and rear wall sections of the open-ended slot 13A5. In order to further enhance the resilience of the left serrated portion 13A2, a compression spring 13A6 (see FIG. 10B) is disposed in the open-ended slot 13A5 by sleeved on the protrusive stubs 13A51, 13A52 such that two opposite ends of the compression spring 13A6 respectively connect with the front and rear wall section of the open-ended slot 13A5. The compression spring 13A6 is preferably made from metal, plastic, or elastomeric material as long as it can provide resilience to the left serrated portion 13A2.

In the disk drive of the present invention, rotation of the second gear 14A in the clockwise and anti-clockwise directions alternately results in movement of the driving plate 13A to the left and right sides of the lower casing half 2A, which, in turn, results in engagement and disengagement of the third gear 15A with the left serrated portion 13A2 of the driving plate 13A, alternately.

Figure 11:
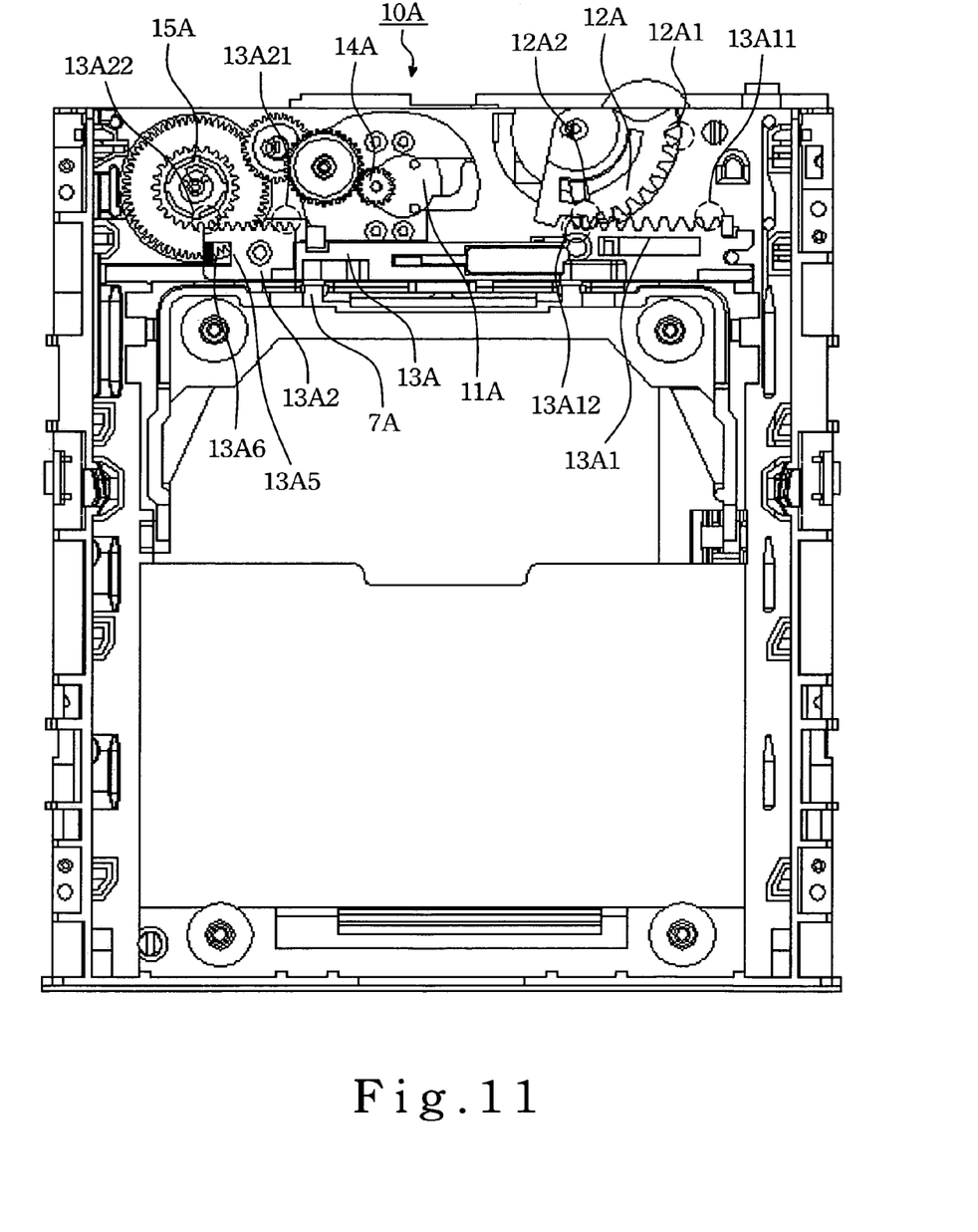
FIG. 11 is a top planar view of the lower casing half in the optical disk drive of the present invention, illustrating the driving plate is at the right side of the lower casing half.

When the driving plate 13A is moved to the left and right sides of the lower casing half 2A, first and second ends 13A11, 13A12 of the right serrated portion 13A1 respectively meshed with first and second ends 12A1, 12A2 of the first gear 12A (see FIGS. 9, 11 and 10A). The left serrated portion 13A2 is not constantly meshed with the third gear 15A. The left serrated portion 13A2 is started to engage with the third gear 15A in the midway of the inletting process of the disk tray 5A. The disc tray 5A would push the driving plate 13A to engage with the third gear 15A in the midway of the inletting process of the disk tray 5A, and then the third gear 15A starts to move the driving plate 13A from left side to right side of the lower casing half 2A (see FIGS. 9, 11 and 10B).

During the initial stage of the engagement and disengagement of the first end 13A21 of the left serrated portion 13A2 with the third gear 15A, jamming action between the two elements can be avoided by virtue of the resilience provided by the open-ended slot 13A5 adjacent to the left serrated portion 13A2. The open-end slot 13A5 also can absorb the force that the third gear 15A applies on the second end 13A22 of the left serrated portion 13A2 to avoid the break of tooth in the second end 13A22.

Since the structure of the other parts of the optical disk drive is not the relevant feature of the present invention, a detailed description thereof is omitted herein for the sake of brevity.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A disk drive comprising:
   a casing defining a longitudinal axis;
   a disk tray disposed within said casing and movable between an extended position, in which, the disk tray extends outwardly from the casing, and a retracted position, in which, the disk tray retracts inwardly into said casing; and
   a gear transmission system including
      a first gear disposed within said casing,
      a gear transmission unit including a second gear and a third gear, rotation of said second and third gears resulting in movement of said disk tray between said extended and retracted positions, and a driving plate disposed within said casing to extend in a transverse direction relative to said longitudinal axis of said casing, and movable along said transverse direction to left and right sides of said casing, said driving plate having a right serrated portion meshed with said first gear, and a left serrated portion disposed adjacent to and facing said third gear, said driving plate being operably associated with said disk tray in such a manner that said left serrated portion of said driving plate starts to engage with said third gear during inletting of said disk tray to said retracted position so as to be driven by said third gear, wherein said driving plate further having an open-ended slot formed at the left end of said driving plate and adjacent to said left serrated portion in such a manner to provide resilience when said left serrated portion is engaged with said third gear.

2. The disk drive according to claim 1, wherein said right serrated portion of said driving plate has first and second ends, said first gear having first and second ends respectively meshed with said first and second ends of said first serrated portion of said driving plate when said driving plate is moved to said left and right sides of said casing.

3. The disk drive according to claim 1, wherein said open-ended slot in said left serrated portion is defined by a slot-confining wall having opposite front and rear wall sections and a lateral side wall section interconnecting said front and rear wall sections, said driving plate further including a pair of protrusive stubs respectively fixed to said front and rear wall sections of said slot-confining wall in aligned condition.

4. The disk drive according to claim 3, wherein said driving plate further includes a compression spring that is sleeved on said protrusive stubs and that has two opposite ends respectively connect with said front and rear wall section of said open-ended slot.

5. The disk drive according to claim 4, wherein said compression spring is made from a material group consisting of metal and plastics.

6. A disk drive comprising:
a lower casing half defining a longitudinal axis;
a disk tray disposed within said lower casing half and movable between an extended position, in which said disk tray extends outwardly from said lower casing half, and a retracted position, in which, said disk tray retracts inwardly into said lower casing half; and
a gear transmission system including
a first gear disposed within said lowercasing half,
a gear transmission unit including a second gear and a third gear, rotation of said second and third gears resulting in movement of said disk tray between said extended and retracted positions, and
a driving plate disposed within said lower casing half to extend in a transverse direction relative to said longitudinal axis, and movable along said transverse direction to left and right sides of said lower casing half, said driving plate having a right serrated portion meshed with said first gear, and a left serrated portion disposed adjacent to and facing said third gear, said driving plate being operably associated with said disk tray in such a manner that said left serrated portion of said driving plate starts to engage with said third gear during inletting of said disk tray to said retracted position so as to be driven by said third gear, wherein said driving plate further having an open-ended slot formed at the left end of said driving plate and adjacent to said left serrated portion in such a manner to provide resilience when said left serrated portion is engaged with said third gear.

7. The disk drive according to claim 6, wherein said right serrated portion of said driving plate has first and second ends, said first gear having first and second ends respectively meshed with said first and second ends of said first serrated portion of said driving plate when said driving plate is moved to said left and right sides of said lower casing half.

8. The disk drive according to claim 6, wherein said open-ended slot in said left serrated portion of said driving plate is defined by a slot-confining wall having opposite front and rear wall sections and a lateral side wall section interconnecting said front and rear wall sections, said driving plate further including a pair of protrusive stubs respectively fixed to said front and rear wall sections of said open-ended slot in aligned condition.

9. The disk drive according to claim 8, wherein said driving plate further includes a compression spring that is sleeved on said protrusive stubs and that has two opposite ends respectively connect with said front and rear wall section of said open-ended slot.

10. The disk drive according to claim 9, wherein said compression spring is made from a material group consisting of metal and plastics.

* * * * *